US009511807B2

United States Patent
Song et al.

(10) Patent No.: US 9,511,807 B2
(45) Date of Patent: Dec. 6, 2016

(54) COMPONENT TRANSFERRING SYSTEM FOR AUTOMOTIVE ASSEMBLY LINE

(71) Applicants: Hyundai Motor Company, Seoul (KR); Hanjinfas, Busan (KR)

(72) Inventors: Yumin Song, Incheon (KR); Jong Ho Maeng, Seongnam-si (KR); Young Gee Kim, Busan (KR)

(73) Assignees: Hyundai Motor Company, Seoul (KR); Hanjinfas, Busan (KR)

( * ) Notice: Subject to any disclaimer, the term of this patent is extended or adjusted under 35 U.S.C. 154(b) by 0 days.

(21) Appl. No.: 14/102,093

(22) Filed: Dec. 10, 2013

(65) Prior Publication Data

US 2014/0186147 A1    Jul. 3, 2014

(30) Foreign Application Priority Data

Dec. 28, 2012    (KR) .................. 10-2012-0157512

(51) Int. Cl.
  *B65D 1/02*    (2006.01)
  *B62D 65/02*    (2006.01)
  *B62D 65/18*    (2006.01)

(52) U.S. Cl.
  CPC ............. *B62D 65/022* (2013.01); *B62D 65/18* (2013.01); *B62D 65/02* (2013.01)

(58) Field of Classification Search
  CPC ........ B62D 65/02; B62D 65/022; B62D 65/18
  USPC .......................................... 414/391
  See application file for complete search history.

(56) References Cited

U.S. PATENT DOCUMENTS

| | | | | |
|---|---|---|---|---|
| 4,589,184 A | * | 5/1986 | Asano et al. | 29/430 |
| 4,799,581 A | * | 1/1989 | Fujii | 198/341.03 |
| 4,941,407 A | * | 7/1990 | Pigott | 104/289 |
| 5,007,783 A | * | 4/1991 | Matsuo | 414/222.05 |
| 5,015,145 A | * | 5/1991 | Angell et al. | 414/547 |
| 8,230,988 B2 | * | 7/2012 | Tada et al. | 198/346.2 |
| 2010/0076591 A1 | * | 3/2010 | Lert, Jr. | 700/216 |

FOREIGN PATENT DOCUMENTS

KR    10-2010-0126495 A    12/2010
KR    10-2012-0061300 A    6/2012

* cited by examiner

*Primary Examiner* — Saul Rodriguez
*Assistant Examiner* — Ashley Romano
(74) *Attorney, Agent, or Firm* — Morgan, Lewis & Bockius LLP (57) ABSTRACT

A component transferring system for a vehicle assembly line may include a carriage unit that is operated by an electrical signal to move along a vehicle assembly line, the carriage unit including a cylinder unit that is disposed at both sides of a front side and a rear side to move up and down in accordance with the moving direction, a both side conveyor that is disposed along a moving route of the carriage unit, and a carriage lifting unit that is disposed at an inside of the both side conveyor in at least one area of the vehicle assembly line to move an object loaded on the carriage unit to the both side conveyor.

4 Claims, 7 Drawing Sheets

COMPONENT TRANSFERRING SYSTEM FOR AUTOMOTIVE ASSEMBLY LINE

CROSS-REFERENCE TO RELATED APPLICATION

The present application claims priority of Korean Patent Application Number 10-2012-0157512 filed Dec. 28, 2012, the entire contents of which application are incorporated herein for all purposes by this reference.

BACKGROUND OF INVENTION

Field of Invention

The present invention relates to a component transferring system for a vehicle assembly line. More particularly, the present invention relates to a component transferring system for a vehicle assembly line that minimizes a load and reduces work force and facility cost in accordance with loading amount of components.

Description of Related Art

Generally, various carriages are being used so as to transfer components or semi-fabricated products in an industry site such as a component fabrication line or an assembly line of a vehicle.

And, an automatic guided vehicle (AGV) has been used in a distribution center where large amount of products are handled, magnetic mark is formed along a route where the AGV is moving, a guide sensor is disposed on the AGV, and the AGV is guided by the detected signal along the route.

When a conventional AGV changes its moving direction, a front steering angle and a rear steering angle are operated in the opposite direction to reduce a turning radius, and when the AGV changes its lane, the front/rear steering angles are operated in the same direction such that the lane can be changed without the rotation of the vehicle body.

Also, when a differential gear is used during a turning, a speed of an inner side wheel is automatically compensated by a differential gear, but when an electric four wheel drive device can reduce its turning radius by increasing the speed of the outside wheel.

However, a manual lifting device is used on the conventional AGV carriage, one AGV carriage is applied to one object or large AGV carriage has to be used to transfer heavy weight object, and therefore investment cost is increased.

Also, a separate work force is necessary to load or unload the object on an unload and load area, and therefore there is a problem that efficiency is deteriorated by the increment of the number of the worker.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a component transferring system for a vehicle assembly line having advantages of minimizing a load that is applied to a carriage unit by loading or unloading an object on a carriage unit through a cylinder unit and a carriage lifting unit.

A component transferring system for a vehicle assembly line according to various aspects of the present invention may include a carriage unit that is operated by an electrical signal to move along a vehicle assembly line, the carriage unit including a cylinder unit that is disposed at both sides of a front side and a rear side to move up and down in accordance with the moving direction, a both side conveyor that is disposed along a moving route of the carriage unit, and a carriage lifting unit that is disposed at an inside of the both side conveyor in at least one area of the vehicle assembly line to move an object loaded on the carriage unit to the both side conveyor.

The carriage unit may further include a box shape carriage frame on which operating wheels are disposed at both sides of a center section of a lower surface thereof to be operated by an electrical signal and casters are disposed at both sides of a front side and a rear side thereof, a guide sensor that is disposed at a center section of the lower surface of the carriage frame between the operating wheels to detect the moving route, mark sensors that are respectively disposed at both sides of a rear side and a front side of the lower surface of the carriage frame with respect to the guide sensor, detecting sensors that are disposed at both sides of a front side and a rear side of the carriage frame to detect obstacles through an ultrasonic wave, and a controller that is disposed inside the carriage frame to control the operating wheels in accordance with detected signals of the sensors.

The carriage frame may include a support plate on an upper side that is connected to the cylinder unit to support the object.

The cylinder unit may include a first cylinder main body that is disposed at both sides of a front side and a rear side inside the carriage frame in an up and down direction, and a locking pin that is disposed at a front end of a first operating rod of the first cylinder main body to be engaged with the object.

The both side conveyor may be disposed at both sides of the carriage unit and a transferring rail is disposed at an upper portion of the both side conveyor to transfer the object that is moved by the carriage lifting unit to a predetermined operation line.

The carriage lifting unit may include a second cylinder main body that is disposed at an inside of the both side conveyor in an up and down direction, and a transferring plate that is disposed at a front end of the second operating rod of the second cylinder main body to support a lower surface of the object loaded on the carriage unit.

The transferring plate may load the object loaded on the carriage unit through the ascending operation of the second operation rod and transfers the object to the both side conveyor through the descending operation of the second operation rod.

The carriage unit may be moved along a transferring route when the object is loaded by the transferring plate through the ascending operation of the second operation rod.

The component transferring system of the present invention transfers or loads an object of a carriage unit through a cylinder unit and a carriage lifting unit to minimize an operating load of the carriage unit. Also, separate work force is not necessary to transfer or unload an object through a carriage lifting unit, and therefore work force and facility cost are reduced.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive, and like reference numerals designate like elements throughout the specification. In the drawings, size and thickness of each element is approximately shown for better understanding and ease of description. Therefore, the present invention is not limited to the drawings, and the thicknesses of layers, films, panels, regions, etc., are exaggerated for clarity.

Figure 1:
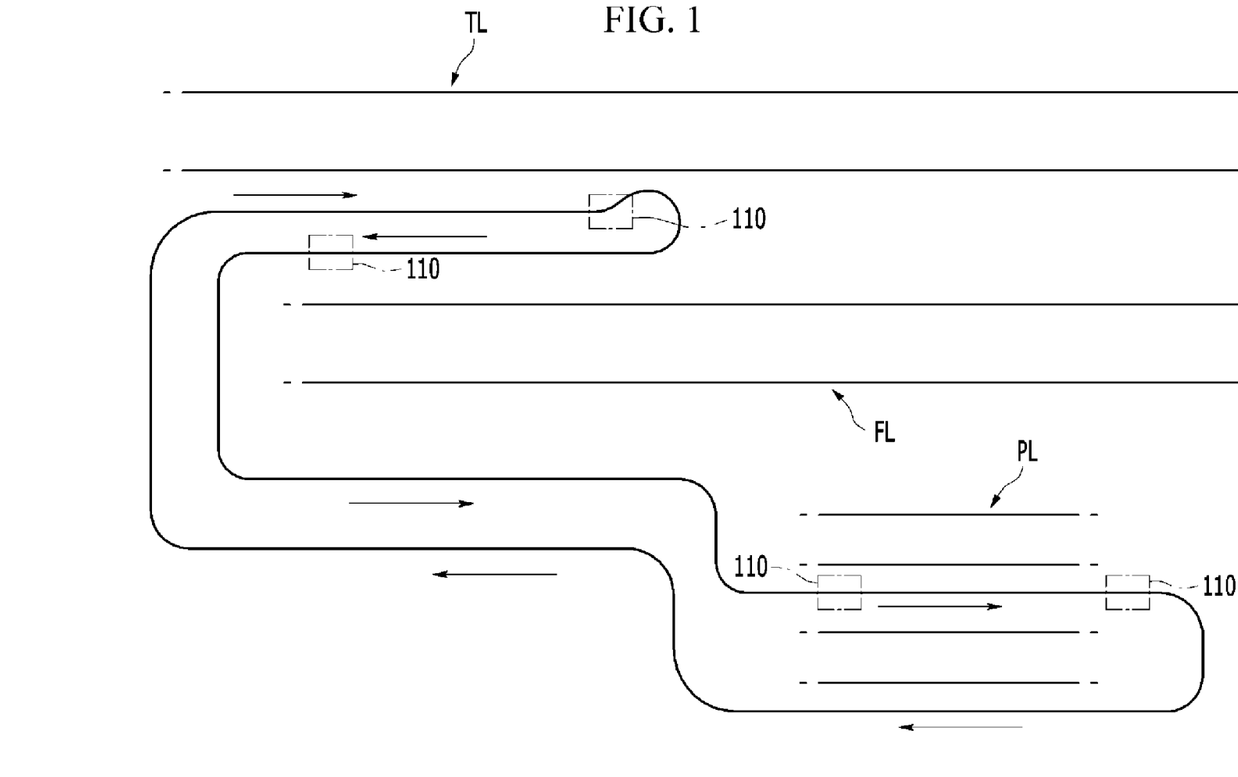
FIG. 1 shows an exemplary component transferring system for a vehicle assembly line that is applied to an assembly process of a vehicle assembly line according to the present invention.

FIG. 1 shows a component transferring system for a vehicle assembly line applied to an assembly process of a vehicle assembly line according to various embodiments of the present invention. Referring to FIG. 1, a component transferring system for a vehicle assembly line of the present invention can be applied to an assembly process of a vehicle assembly line where components are assembled on related positions of a vehicle body at a trim line (TL) and other components are assembled on the vehicle body at a final line (FL) as a following process.

For example, a component transferring system for a vehicle assembly line can be applied to an assembly process where all kinds of components picked at a picking order line(PL) are loaded and the components are unloaded at the trim line (TL) and the final line (FL).

The component transferring system for a vehicle assembly line has a configuration for minimizing load according to loading amount of the object C, the number of workers, and facility investment cost.

Figure 2:
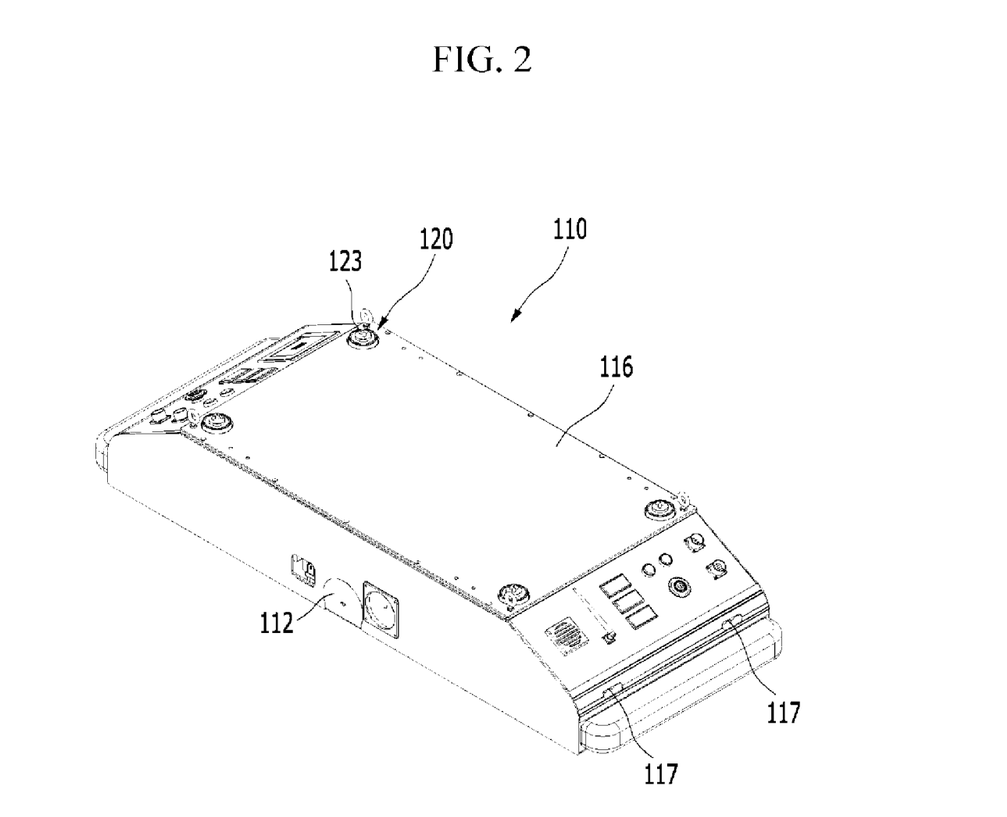
FIG. 2 is a perspective view of an exemplary carriage unit of a component transferring system for a vehicle assembly line according to the present invention.
Figure 3:
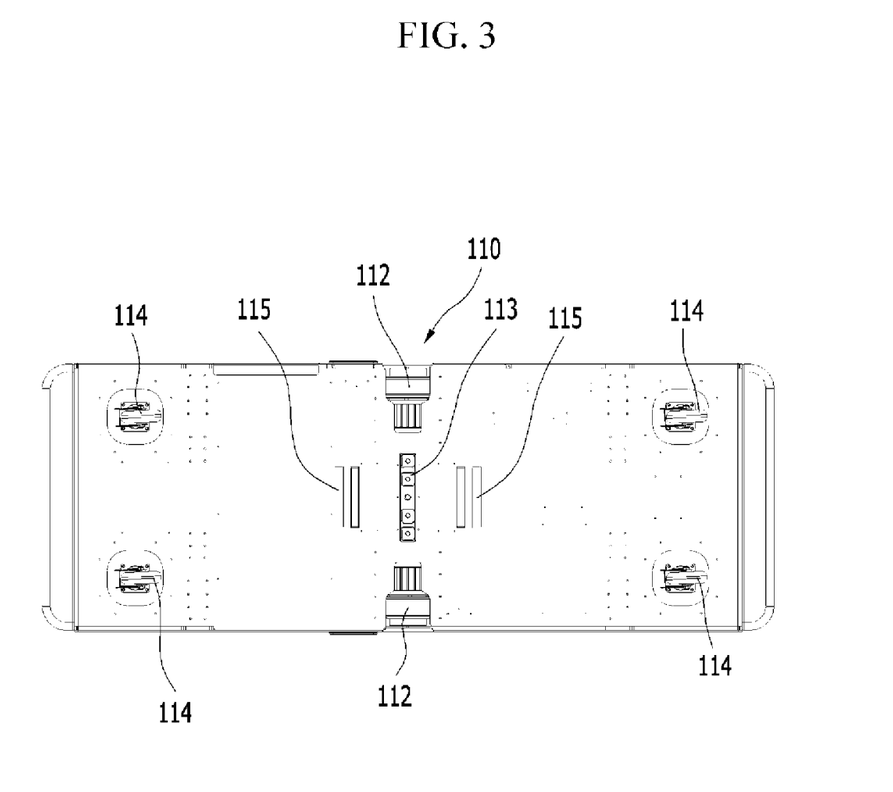
FIG. 3 is a bottom view of an exemplary carriage unit of a component transferring system for a vehicle assembly line according to the present invention.
Figure 4:
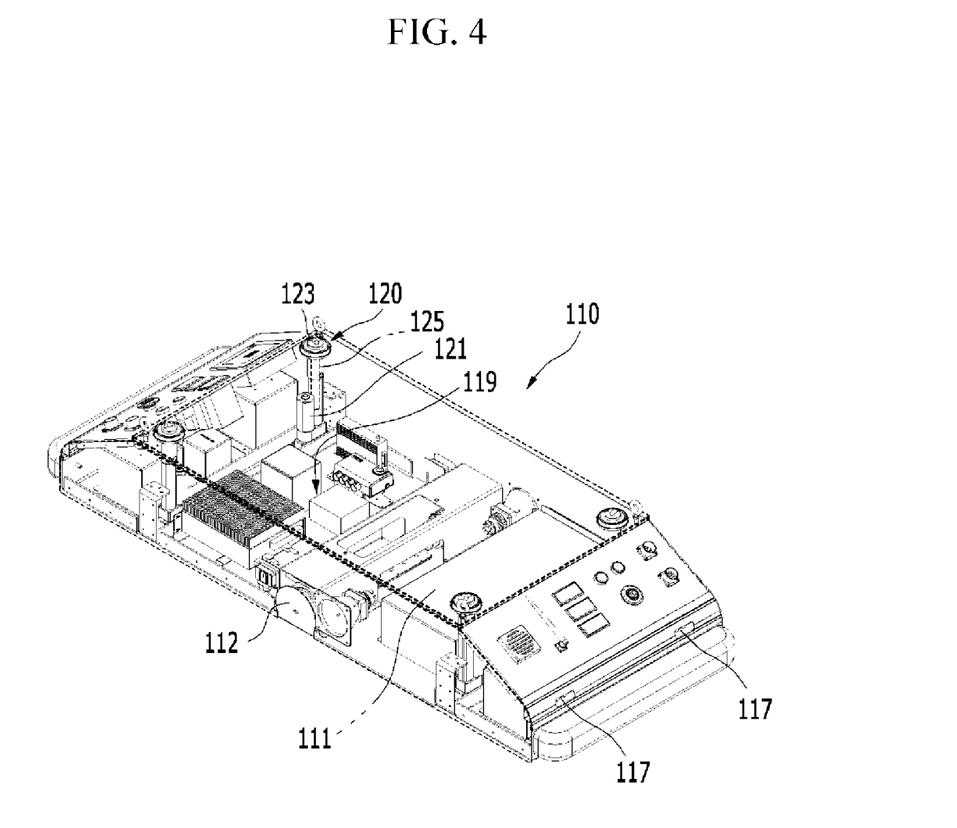
FIG. 4 is a perspective view showing an inner structure of an exemplary carriage unit of a component transferring system for a vehicle assembly line according to the present invention.
Figure 5:
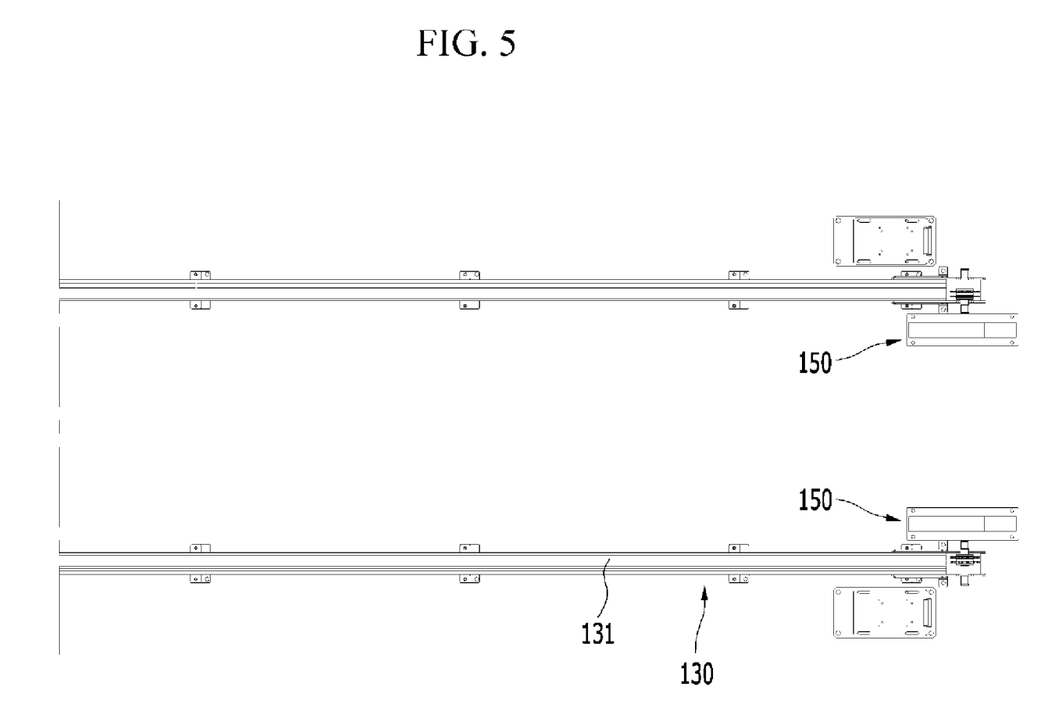
FIG. 5 is a top plan view of a conveyor that is applied to an exemplary component transferring system for a vehicle assembly line according to the present invention.
Figure 6:
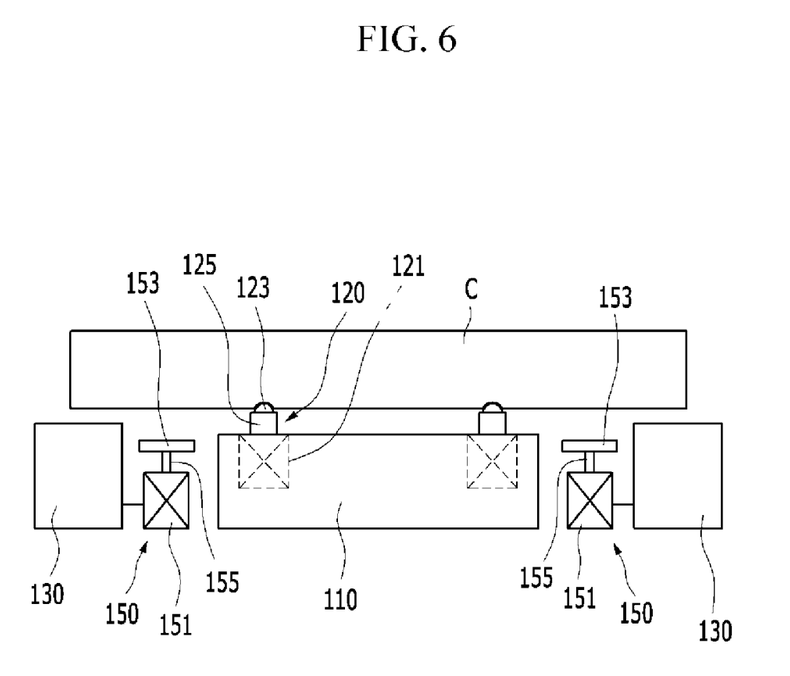
FIG. 6 is a front view illustrating an exemplary carriage unit that is entered onto a conveyor in the present invention.

FIG. 2 is a perspective view of a carriage unit that is applied to a component transferring system for a vehicle assembly line according to various embodiments of the present invention, FIG. 3 is a bottom view of a carriage unit that is applied to a component transferring system for a vehicle assembly line according to various embodiments of the present invention, FIG. 4 is a perspective view showing an inner structure of a carriage unit that is applied to a component transferring system for a vehicle assembly line according to various embodiments of the present invention, FIG. 5 is a top plan view of a conveyor that is applied to a component transferring system for a vehicle assembly line according to various embodiments of the present invention, and FIG. 6 is a front view that a carriage unit is entered onto a conveyor in various embodiments of the present invention.

Referring to FIG. 2 to FIG. 6, a component transferring system for a vehicle assembly line includes a carriage unit 110, a both side conveyor 130, and a carriage lifting unit 150, and these will be described as follows.

First, as shown in FIG. 2 to FIG. 4, the carriage unit 110 is operated by an electrical signal to move along a vehicle assembly line and includes a cylinder unit 120 that is disposed at both sides of a front/rear side in accordance with the moving direction.

The carriage unit 110 includes a carriage frame 111, a guide sensor 113, a mark sensor 115, a detecting sensor 117, and a controller 119, and these hereinafter will be respectively described.

The carriage frame 111 has a box shape, an operating wheel 112 is disposed at both sides of a center or a center section of a lower surface thereof to be operated by an electrical signal, and casters 114 are disposed at both sides of a front/rear side of a lower surface thereof.

Here, the carriage frame 111 includes a supporting plate 116 on an upper side that is connected to the cylinder unit 120 to support an object (C) that is to be transferred. The cylinder unit 120 that is described above includes a first cylinder main body 121 and a locking pin 123.

The first cylinder main body 121 is disposed in an upper/lower direction or a vertical direction at both sides of a front/rear side of the carriage frame 111, and the locking pin 123 is disposed at a front end of the first operating rod 125 of the first cylinder main body 121 to be engaged with the object (C).

The guide sensor 113 is disposed at a center or a center section of a lower surface of the carriage frame 111 between the operating wheels 112 to detect the moving route.

And, the mark sensors 115 are disposed at both sides of a front/rear side of a lower surface of the carriage frame 111 with respect to the guide sensor 113 to detect deceleration, acceleration, and stop position.

The detecting sensor 117 is disposed at both sides of a front/rear side of the carriage frame 111 to detect an obstacle through an ultrasonic wave or waves.

Next, the controller 119 is disposed inside the carriage frame 111 to control the operation of the operating wheel 112 in accordance with the detection signal of the sensor.

As shown in FIG. 5, the both side conveyor 130 is disposed along a route of the carriage unit 110, having two sides substantially in parallel with each other in accordance with various embodiments of the present invention.

The both side conveyor 130 is disposed at both sides of the movement route of the carriage unit 110, and a transferring rail 131 that can transfer the object C that is unloaded by the carriage lifting unit 150 to another predetermined working line is disposed on the both side conveyor 130.

As shown in FIG. 6, the carriage lifting unit 150 is disposed between the both side conveyor 130 at one section of the vehicle assembly line to transfer the object C that is loaded on the carriage unit 110 to the both side conveyor 130. Here, the carriage lifting unit 150 includes a second cylinder main body 151 and a transferring plate 153.

The second cylinder main body 151 is disposed between the both side conveyor 130 in an up/down direction or a vertical direction, and the transferring plate 153 is disposed at a front end of the second operating rod 155 of the second cylinder main body 151 to support a lower surface of the object C that is loaded on the carriage unit 110.

That is, the transferring plate 153 lifts the object C that is loaded on the carriage unit 110 through the ascending operation of the second operating rod 155 and loads the object C on the both side conveyor 130 through the descending operation of the second operating rod 155.

Meanwhile, the carriage unit 110 moves along its moving route while the transferring plate 153 unloads the object through the ascending operation of the second operating rod 155.

Hereinafter, operation of a component transferring system for a vehicle assembly line according to various embodiments of the present invention as described above will be described with the accompanying drawings.

Figure 7:
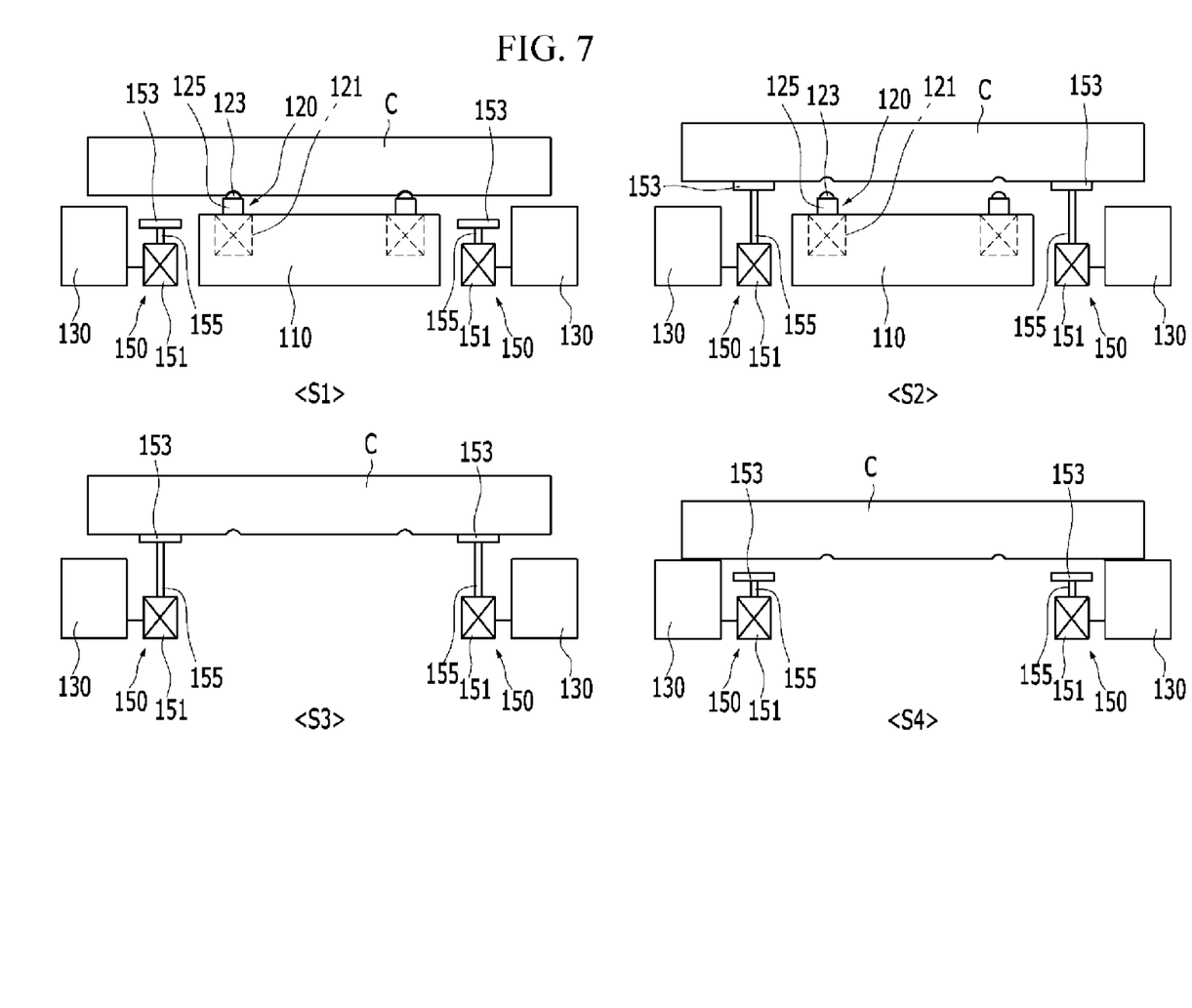
FIG. 7 shows an operation of an exemplary component transferring system for a vehicle assembly line according to the present invention.

FIG. 7 shows operation of a component transferring system for a vehicle assembly line according to various embodiments of the present invention. Referring to FIG. 1 and FIG. 7, the carriage unit 110 enters into an inlet of the picking order line (PL) that is separately prepared in a distribution house, wherein the cylinder unit 120 of the carriage unit 110 maintains its descent condition.

And, the carriage unit 110 moves to an outlet of the picking order line (PL) in a condition in which the cylinder unit 120 is descended, and if the carriage unit 110 arrives on the outlet of the picking order line (PL), the cylinder unit 120 maintains its ascent condition.

Thus, the carriage lifting unit 150 loads object C on the carriage unit 110 in a condition that the cylinder unit 120 is ascended, and the carriage unit 110 with the object C loaded moves to a working line.

The carriage unit 110 that enters into the working line moves along the transferring route that is formed between the sides of the both side conveyor 130 and stops at an area where the carriage lifting unit 150 is disposed at an inner side of the both side conveyor 130.

If the above step is completed, the second operating rod 155 of the carriage lifting unit 150 performs ascending operation and the transferring plate 153 that is disposed at a front end of the second operating rod 155 lifts the object C that is loaded on the carriage unit 110 higher than the height of the locking pin 123 of the cylinder unit 120 S2.

Thus, in a condition in which the object C is loaded on the transferring plate 153, the carriage unit 110 moves to next position along the transferring route S3.

After the above step is completed, the transferring plate 153 where the object C is loaded is descended by the descent operation of the second operating rod 155 and the object C contacts the transferring rail 131 of the both side conveyor 130 S4.

Thus, the object C that contacts the transferring rail 131 of the both side conveyor 130 moves to a working line along the transferring rail 131.

And, the carriage unit 110 moves again so as to transfer object C to a picking order line PL through a final line FL or perform other transferring tasks.

Accordingly, a component transferring system for a vehicle assembly line of the present invention transfers or loads the object C of the carriage unit 110 through the cylinder unit 120 and the carriage lifting unit 150, and therefore there is an effect that the load of the carriage unit 110 is minimized. Also, separate workers are not necessary to load or unload the object C through the carriage lifting unit 150, and therefore workers and facility cost are reduced.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A component transferring system for a vehicle assembly line, comprising:
    a carriage unit operated in response to an electrical signal from a controller to move along the vehicle assembly line,
        wherein the carriage unit includes a carriage frame and cylinder units and
        wherein each of the cylinder units is disposed at a front side and a rear side of the carriage unit respectively and moves up and down;
    a conveyor disposed along a moving route of the carriage unit;
    a carriage lifting unit disposed inside of the conveyor in at least one area of the vehicle assembly line, separated from the carriage unit, and moving an object loaded on the carriage unit to the conveyor according to an electrical signal from the controller;
    a guide sensor disposed at a center section of a lower surface of the carriage frame between operating wheels to detect the moving route of the carriage unit;
    mark sensors each of which is disposed at each of a rear side and a front side of a bottom surface of the carriage frame with respect to the guide sensor to detect deceleration, acceleration and stop position of the carriage unit; and
    detecting sensors disposed at a front side and a rear side of the carriage frame to detect obstacles using an ultrasonic wave,
    wherein the operating wheels are mounted at left and right sides of the center section of the lower surface of the carriage frame and are operated according to the electrical signal from the controller and casters are mounted at the front side and the rear side of the carriage frame, and
    wherein the controller is mounted inside the carriage frame to control the operating wheels in accordance with detected signals of the guide, mark, and/or detecting sensors, wherein the conveyor is disposed at left and right sides of the carriage unit and a transferring rail is disposed at an upper portion of the conveyor to transfer the object moved by the carriage lifting unit to a predetermined operation line, and wherein the carriage lifting unit includes:
- a first cylinder main body disposed at the front side and the rear side of the carriage frame inside the carriage frame in an up and down direction; and
- a locking pin disposed at a front end of a first operating rod of the first cylinder main body wherein a front end of the locking pin is selectively inserted into a groove formed at a predetermined position of a lower surface of the object;
- a second cylinder main body disposed at an inside of the conveyor in an up and down direction; and
- a transferring plate disposed at a front end of a second operating rod of the second cylinder main body to support the lower surface of the object loaded on the carriage unit.

2. The component transferring system for the vehicle assembly line of claim 1, wherein the carriage frame includes a support plate on an upper side thereof that is connected to the cylinder units to support the object.

3. The component transferring system for the vehicle assembly line of claim 1, wherein the transferring plate loads the object loaded on the carriage unit through an ascending operation of the second operation rod and transfers the object to the conveyor through a descending operation of the second operation rod.

4. The component transferring system for the vehicle assembly line of claim 1, wherein the carriage unit is moved along a transferring route when the object is loaded by the transferring plate through the ascending operation of the second operation rod.

* * * * *